(12) United States Patent
Soliven et al.

(10) Patent No.: US 12,145,489 B2
(45) Date of Patent: Nov. 19, 2024

(54) ADJUSTABLE HEADREST

(71) Applicant: Adient US LLC, Plymouth, MI (US)

(72) Inventors: Reinier Soliven, Oakland, MI (US); John Gomez, Howell, MI (US); Joseph Gasko, Commerce Township, MI (US)

(73) Assignee: Adient US LLC, Plymouth, MI (US)

( * ) Notice: Subject to any disclaimer, the term of this patent is extended or adjusted under 35 U.S.C. 154(b) by 196 days.

(21) Appl. No.: 17/647,377

(22) Filed: Jan. 7, 2022

(65) Prior Publication Data
US 2022/0219586 A1 Jul. 14, 2022

Related U.S. Application Data

(60) Provisional application No. 63/135,805, filed on Jan. 11, 2021.

(51) Int. Cl.
*B60N 2/897* (2018.01)
*B60N 2/80* (2018.01)
*B60N 2/818* (2018.01)

(52) U.S. Cl.
CPC ............. *B60N 2/897* (2018.02); *B60N 2/818* (2018.02)

(58) Field of Classification Search
CPC ................................ B60N 2/897; B60N 2/818
See application file for complete search history.

(56) References Cited

U.S. PATENT DOCUMENTS

| | | | | |
|---|---|---|---|---|
| 4,830,434 A | * | 5/1989 | Ishida | B60N 2/829 297/410 |
| 5,860,703 A | * | 1/1999 | Courtois | B60N 2/818 297/410 |
| 6,761,401 B1 | * | 7/2004 | McGlynn | B62J 1/12 297/211 |
| 2010/0194167 A1 | * | 8/2010 | Gans | B60N 2/818 297/410 |
| 2017/0334328 A1 | * | 11/2017 | Müller | B60N 2/818 |

* cited by examiner

*Primary Examiner* — David R Dunn
*Assistant Examiner* — Tania Abraham
(74) *Attorney, Agent, or Firm* — Marshall & Melhorn, LLC

(57) ABSTRACT

A headrest assembly may have a connecting member extending between a headrest and a seat back of the headrest assembly. A mechanism may be located in the headrest assembly or the seat back. The mechanism permits selective movement of the headrest with respect to the connecting member.

12 Claims, 8 Drawing Sheets

ADJUSTABLE HEADREST

FIELD

Several embodiments of an adjustable headrest for a seat, such as for a seat in a vehicle, including but not limited to a passenger-type vehicle, like a car or truck, are disclosed. The headrests may have applicability in other vehicles as well.

BACKGROUND

Vehicles, including passenger-type vehicles, include seats for occupants. The seats often have headrests for both passenger comfort and safety.

Prior art headrest designs can be complex structures with complex connection mechanisms to the seat. The complexity of the prior art designs contributes to several disadvantages, including at least their high cost, weight and complexity.

The complexity of the prior art designs may also makes it difficult for users to adjust the headrest. For example, prior art headrest designs may require the user to reach behind them, find a small button where the headrest connects with the seat, engage the button and then adjust the headrest to the desired position. Some users have difficulty reaching behind their head, particularly if they are driving. Even if the users can reach behind their head, most will have difficulty finding the small headrest release button that must be engaged often while simultaneously moving the headrest either up or down.

In view of the disadvantages associated with the prior art designs, it would be advantageous to have a headrest that was lightweight, as well as simple in its design so it was easy and cost effective to manufacture. It would also be advantageous for the new headrest to be at least as comfortable and safe, if not more, than the prior art designs. Further, it would be advantageous for the headrest to be easily adjustable by a large number of users.

SUMMARY

In one aspect, a headrest assembly may have a connecting member extending between a headrest and a seat back of the headrest assembly. The connecting member may have a plurality of teeth. A mechanism may be located in the headrest or the seat back. A portion of the mechanism may be adapted to selectively pivot about the connecting member. A pivot in a first direction may release the mechanism from the plurality of teeth and may permit the connecting member or the mechanism to move with respect to one another. A pivot in a second direction, opposite the first direction, may lock the mechanism to the teeth to prevent the headrest from moving vertically with respect to the seat back.

In another aspect, the connecting member may be a rod fixed with respect to the headrest.

In another aspect, the mechanism may comprise a tooth that is selectively biased into engagement with the plurality of teeth on the rod.

In another aspect, the tooth may be biased by a leaf spring located between a front guide containing the tooth and a front wall of the mechanism.

In another aspect, the front guide may extend substantially parallel the rod.

In another aspect, a pivot point for the headrest may be located on the rod in the headrest, where the pivot point may be located above the tooth.

In another aspect, a headrest assembly may have a connecting member extending between a headrest and a seat back of the headrest assembly. The connecting member may have a plurality of windows. The assembly may also have a mechanism located in the headrest. A portion of the mechanism may be adapted to selectively pivot about the connecting member. A pivot in a first direction may release the mechanism from the plurality of windows and permit the connecting member or the mechanism to move with respect to one another. And, a pivot in a second direction, opposite the first direction, may lock the mechanism to windows to prevent the headrest from moving vertically with respect to the seat back.

In another aspect, the connecting member may comprise a back portion fixed with respect to the seat back. The back portion may have C-shaped side portions. The mechanism may comprise an adjustment plate moveable with respect to the back portion within the C-shaped side portions.

In another aspect, the adjustment plate may comprise a pin extending through a slot in at least one of the C-shaped side portions. The pin may be a pivot point for the adjustment plate.

In another aspect, extensions may be connected to the adjustment plate that are selectively pivoted within one of the plurality of windows at a time to lock the adjustment plate with respect to the connecting member.

In another aspect, the windows may be located one above the other in the back portion in a parallel fashion.

In another aspect, a headrest assembly may have a connecting member extending between a headrest and a seat back of the headrest assembly. The connecting member may have a plurality of teeth. The assembly may also have a mechanism located in the seat back. A portion of the connecting member may be adapted to selectively pivot about the mechanism. A pivot in a first direction may release the connecting member from the mechanism and may permit the connecting member to move with respect to the mechanism. A pivot in a second direction, opposite the first direction, may lock the connecting member to the mechanism to prevent the headrest from moving vertically with respect to the seat back.

In another aspect, the connecting member may comprise a rod with teeth formed thereon.

In another aspect, the mechanism may comprise a front guide at least partially located within a fixed guide.

In another aspect, the front guide may be pivotally connected to the fixed guide at lower portions of both the front guide and the fixed guide.

In another aspect, the rod may extend through both the front guide and the fixed guide where the rod may be adapted for selective vertical movement with respect to both guides.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

Figure 1:
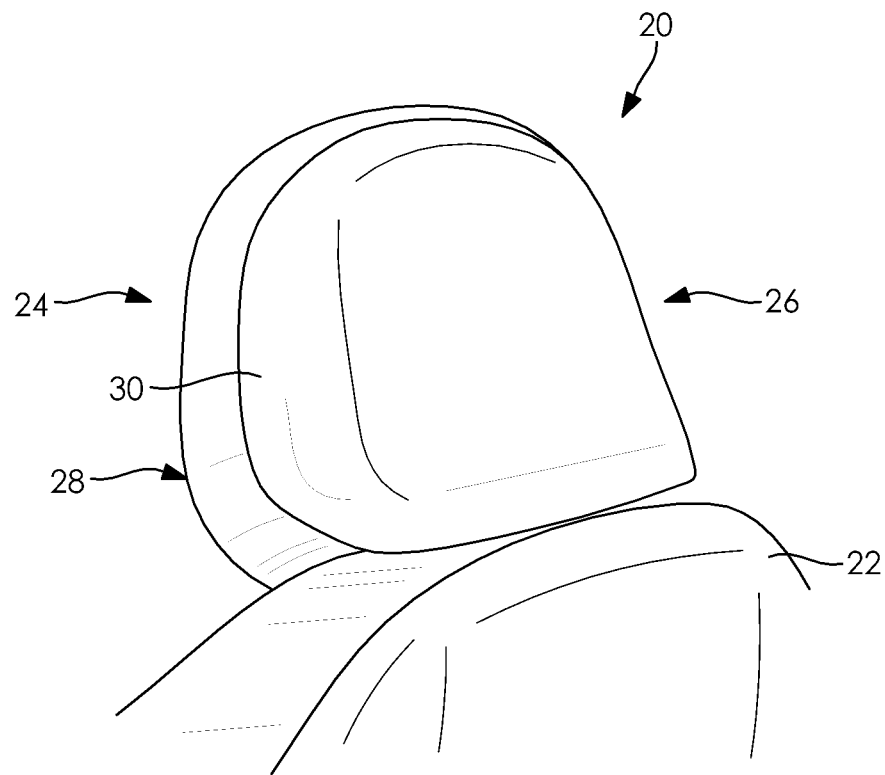
FIG. 1 depicts a rear perspective view of one embodiment of a headrest.

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless the expressly stated otherwise.

Turning now to FIGS. 1-10, one embodiment of a headrest assembly 20 is schematically depicted. The headrest assembly 20 may be adapted to be selectively attached to, and removed from, a seat, such as a vehicle seat 22. While a vehicle seat 22 is mentioned, and discussed below, the headrest assembly 20 is not limited to vehicle seats 22 but instead can be used with any seat. If adapted to a vehicle, the headrest assembly 20 can be used in many kinds of vehicles, including, but not limited to, passenger vehicles, such as cars and trucks.

The headrest assembly 20 may have a forward portion 24 and a rear portion 26 (relative to the x-axis), opposite the forward portion 24. Side portions 28 may connect the forward portion 24 to the rear portion 26. The headrest assembly 20 may be generally be one piece, or it may be comprised of two or more pieces, such as separate forward and rear portions 24, 26 that have been joined together.

The forward portion 24 may be the side facing the seat occupant (the x direction). As such, the forward portion 24 may have a concave design that may assist in centering the seat occupant's head on the forward portion 24. Other shapes and sizes for the forward portion 24 are also permissible. The rear portion 26 may be generally planar but other shapes may be permissible.

The side portions 28 and/or the rear portion 26 may have hand holds 30. One embodiment of such hand holds 30 may be seen in FIG. 1. In this example, the hand holds 30 may be such as indentations integrally formed in the side portions 28 or the rear portion 26. The indentations make it easier for the occupant to grasp the forward portion 24 and move the headrest assembly 20 as described and depicted in the other figures and below. The hand holds 30 may also be separately formed and attached to the headrest assembly 30.

It may also be possible for the headrest assembly 20 to have one or more fluid channels (not shown), such as air flow channels, extending at least partially through the headrest assembly 20. The fluid channels may begin on any of the portions and extend to any other portions.

Figure 2:
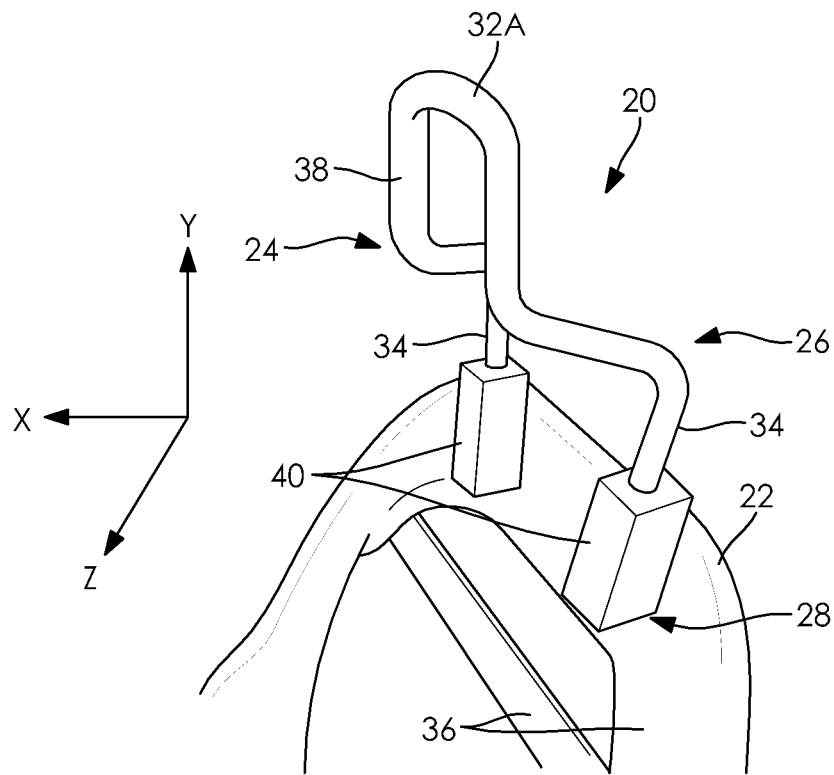
FIG. 2 depicts a front perspective view of one embodiment of a frame for a headrest.
Figure 3:
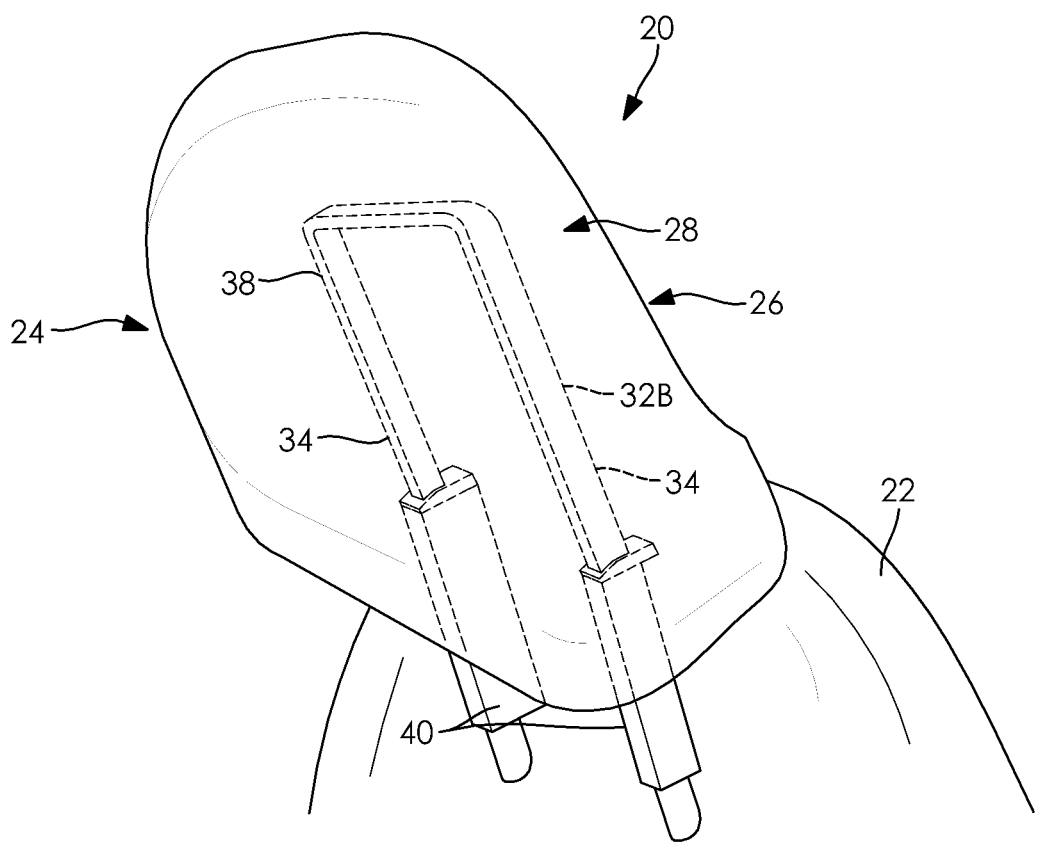
FIG. 3 depicts a perspective view of one embodiment of a frame and sleeve assembly for a headrest.

In some embodiments, a frame may extend at least partially into the headrest assembly 20. FIGS. 2 and 3 show two embodiments for headrest frames 32A, 32B. In these embodiments, the frames 32A, 32B may be hollow (in whole or in part) or solid (in whole or in part) with any cross-section, including but not limited to round, square or rectangular.

The frames 32A, 32B may have two mounting posts 34, which connect with the seat frame 36. The mounting posts 34 may be the same as one another, or they may be different.

The two mounting posts 34 may be connected by a hoop portion 38. The hoop portion 38 may be integrally formed, unitary and one piece with the mounting posts 34, or it may be a separately connected component. In either case, the hoop portion 38 is designed to extend into the headrest assembly 20. In some embodiments, the hoop portion 38 may be stationary within the headrest assembly 20.

While the term hoop is used, is it not limited to only circular perimeters but instead the hoop portion 38 can take most any shapes, two of which are shown in FIGS. 2 and 3.

Regardless of the size, shape or orientation of the frames 32A, 32B, the frames 32A, 32B are designed to provide rigidity to the headrest assembly 20 and provide a connection point between the headrest assembly 20 and the seat frame 36.

The mounting posts 34 may be selectively received within a seat 22. In some embodiments, such as shown in at least FIGS. 4-6, each mounting post 34 may be selectively received within a sleeve assembly 40 where each sleeve assembly 40 is located within the seat 22.

In FIG. 2, the sleeve assemblies 40 are shown as attached to the seat frame 36. In this embodiment, except as being attached to the seat frame 36, the assemblies 40 may be separate modules and otherwise not connected. However, in other embodiments, the sleeve assemblies 40 (both) may form a single module that is attached to the seat frame 36.

Each sleeve assembly 40 may be comprised of a fixed receiver 42. The receiver 42 may have a hollow interior 44 defined by, or bounded by, a perimeter wall 46. The perimeter wall 46 may be partial or complete and the perimeter wall 46 may define a tubular or cone shaped structure.

Each sleeve assembly 40 may also be comprised of a fixed guide 48 and a front guide 50. Both guides 48, 50 are at least partially located within the receiver 42. The fixed guide 48 may be stationary with respect to the mounting post 34, which is free to selectively move at least vertically (the y-direction) with respect to the fixed guide 48, as can be appreciated from FIGS. 9A and 9B. Further, the fixed guide 48 may be stationary with respect to the front guide 50. More particularly, in some embodiments, the front guide 50 may selectively move, such as pivot, with respect to the fixed guide 48.

Figure 9A:
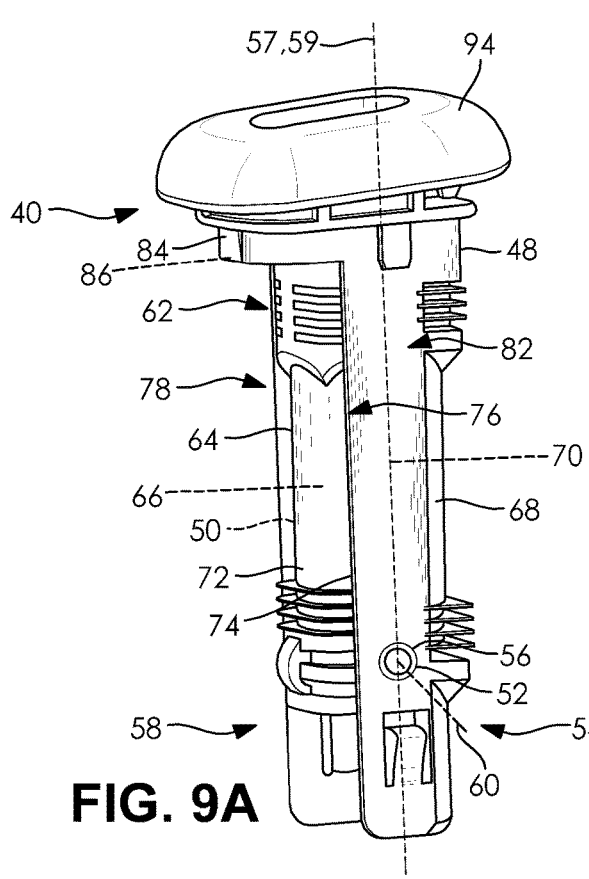
FIG. 9A depicts a perspective view of one embodiment of a portion of a sleeve assembly in a first state.
Figure 9B:
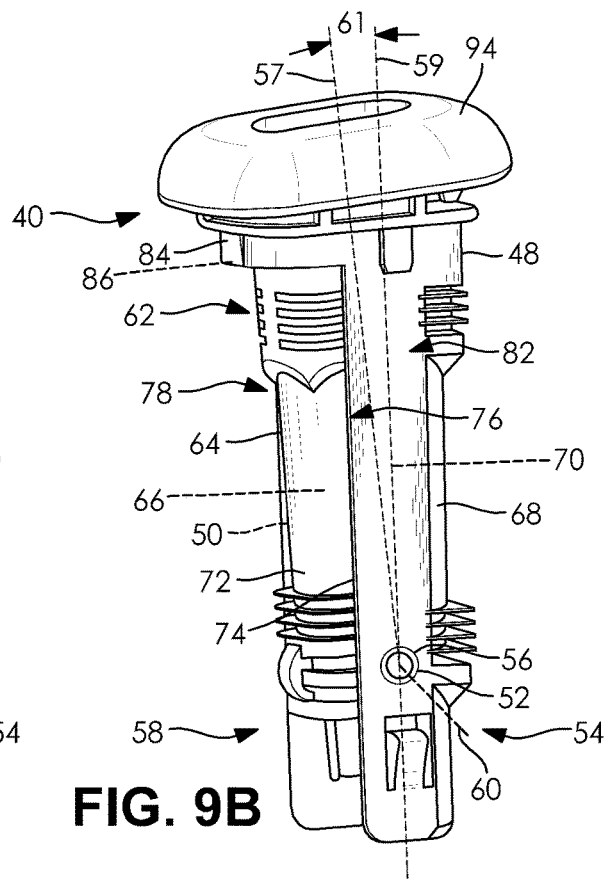
FIG. 9B depicts a perspective view of one embodiment of a portion of a sleeve assembly in a second state.
Figure 10:
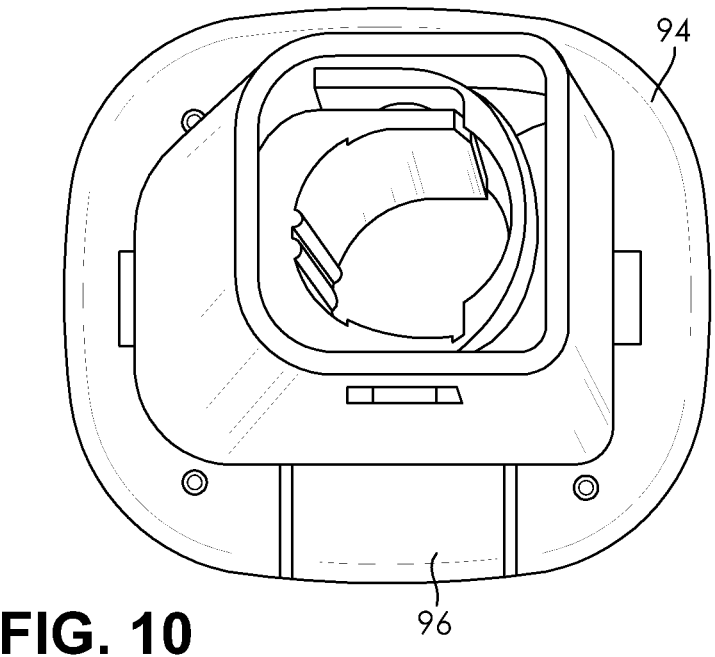
FIG. 10 depicts a top view of one embodiment of a portion of a sleeve assembly.

FIGS. 9A and 9B show one embodiment of the front guide 50 and the fixed guide 48. The fixed guide 48 may have aligned pin apertures 52 in a lower portion 54 thereof. The front guide 50 may have aligned pins 56 on a lower portion 58 thereof that are complementary to the pin apertures 52 and are designed to fit therein. The pins 56 and pin apertures 52 permit the front guide 50 to selectively pivot, such as in the forward direction (x-direction), with respect to the fixed guide 48. Indeed, the pins 56 and pin apertures 52 may create a pivot point, or pivot axis 60, between the front guide 58 and the fixed guide 54. More particularly, an upper portion 62 of the front guide 50 may pivot in the x-direction away from and out from the fixed guide 48. The lower portion 58 of the front guide 50 while permitted to pivot, is otherwise secured as noted to the fixed guide 48. FIG. 9A depicts the front guide 50 having its y axis 57 aligned with the y axis 59 of the fixed guide 48. FIG. 9B depicts the front guide 50 tilted with respect to the fixed guide 48 to create angle 61 between the respective axis 57, 59.

From FIGS. 9A, 9B it can also be appreciated that the front guide 50 may selectively fit at least partially within the fixed guide 48. By way of one example, the front guide 50 may have a casing 64 that at least partially surrounds a generally hollow interior 66. Similarly, the fixed guide 48 may have a casing 68 that at least partially surrounds a generally hollow interior 70. The front guide casing 64 may have a smaller outer diameter 72 than an inner diameter 74 of the fixed guide casing 68 so that the front guide 50 may at least partially nest within the fixed guide 48, which may be appreciated from FIG. 9. This nested relationship may also be appreciated from FIG. 10.

Looking again at FIGS. 9A and 9B, it can be appreciated that the fixed guide casing 68 may not entirely enclose the front guide casing 64; instead, a portion, such as a front portion 76 of the fixed guide casing 68 may be open. The opening 78 in the fixed guide casing 68 may extend continuously from the lower portion 58 of the fixed guide casing 68 to an upper portion 82 of the fixed guide casing 68. The opening 78 in the fixed guide casing 68 permits the upper portion 62 of the front guide casing 68 to selectively pivot out of the nested relationship with the fixed guide casing 68.

In a further embodiment, the upper, front portion 76, 82 of the fixed guide casing 68 may have a collar 84. The collar 84 may bound the opening 78 and be located above it. The collar 78 may be a ring or a partial ring. The collar 84 may prevent the front guide casing 64 from pivoting beyond a predetermined limit with respect to the fixed guide casing 68 as a front portion of the upper portion 68 of the front guide 62 comes in selective contact with an interior surface 86 of the collar 84.

Figure 4:
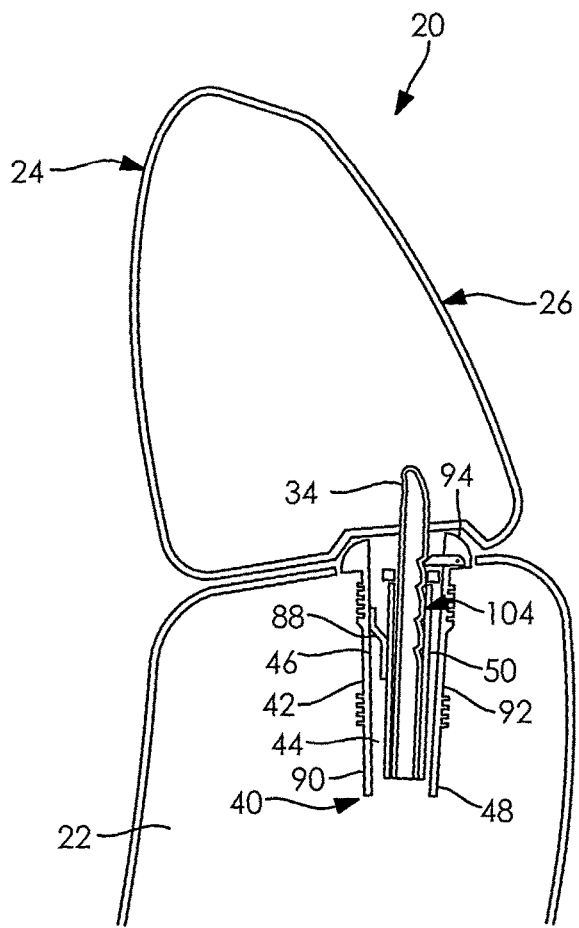
FIG. 4 depicts a schematic side view of one embodiment of a sleeve assembly for a headrest in one state.
Figure 5:
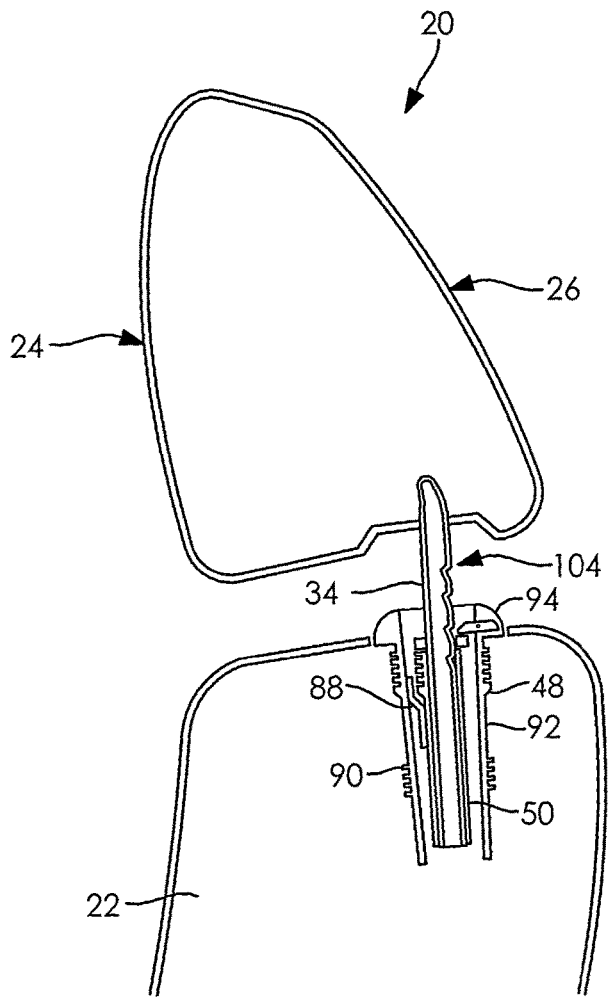
FIG. 5 depicts a schematic side view of one embodiment of a sleeve assembly for a headrest in a second state.
Figure 6:
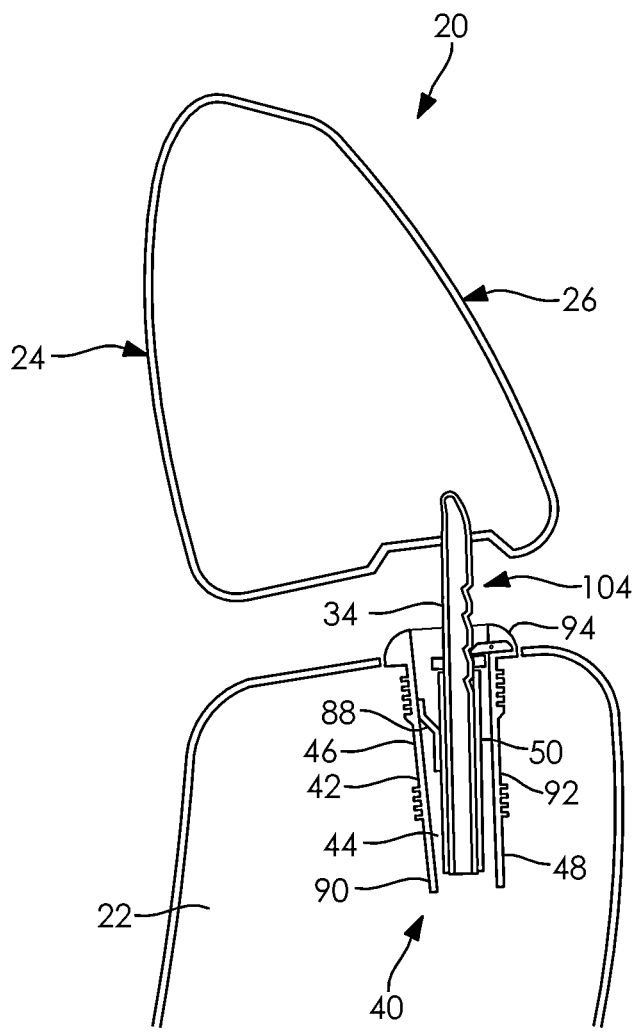
FIG. 6 depicts a schematic side view of one embodiment of a sleeve assembly for a headrest in a third state.
Figure 7:
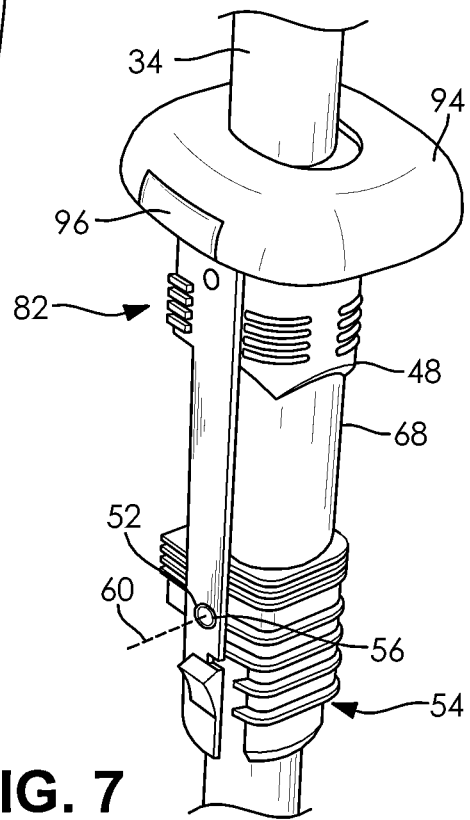
FIG. 7 depicts a perspective view of one embodiment of a portion of a sleeve assembly.

The front guide 50 may be biased into the nested relationship with the fixed guide 48, such as by one or more biasing members 88, including springs, which may include leaf springs. FIGS. 4-6 depict one embodiment of a biasing member 88 in one of the sleeve assemblies 40. In these embodiments, a leaf spring 88 may be positioned between a front wall 90 of the receiver 42 and the front guide 50. While only a single leaf spring 88 is shown, additional leaf springs, or entirely different types of springs, or biasing members, including foam, may be used.

Biasing members (not shown), such as leaf springs, or even a foam material, may be located between a rear wall 92 of the receiver 42 and the fixed guide 48. These biasing members may assist in locating the fixed guide 48, and the other structures it contacts, into the correct position.

Figure 8:
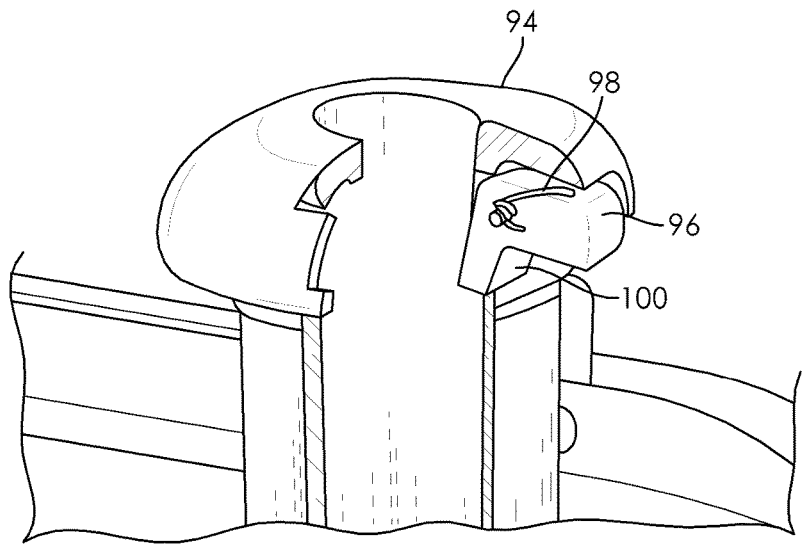
FIG. 8 depicts a perspective view of one embodiment of a portion of a sleeve assembly.

At least one of the sleeve assemblies 48 or 50 may have a cap 94 located above the fixed and front guides 48, 50 as shown in at least FIGS. 4-9A, B. A locking pin, or lever 96, may be at least partially located within, or otherwise associated with, the cap 94. One embodiment of a locking lever 96 may be seen in FIGS. 4-8. The locking lever 96 may be spring biased with a wire-type spring, as shown in FIG. 8. The locking lever 96 may have a lower catch 100 that is biased into a mounting post 34. The mounting post 34 may have a plurality of spaced apart teeth 104 longitudinally (along the y-axis) arranged on at least a portion thereof. The spring 98 on the locking lever 96 is designed to bias the catch 100 into one of the teeth 104 by default so as to fix the mounting post 34, and thus the headrest assembly 20, in a particular vertical orientation.

In some embodiments, the headrest assembly 20 can be selectively laterally (e.g., forward and back, which is the x direction) moved via the structures described above. By way of one example, FIG. 4 depicts the headrest assembly 20 in a lowered position. In another position, the headrest assembly 20 may be biased, or tilted, forward in the x-direction as shown in FIG. 5. This causes the mounting posts 34 to also tilt forward within the fixed receiver 42 and forward with respect to the fixed guide 48. The front guide 50, however, moves with the mounting posts 34 and tilts at the same or similar angle. The tilt takes the catch 100 of the locking lever 96 out of engagement with the teeth 104 on the mounting post 34. As a result, the mounting post 34, or headrest assembly 20, is no longer constrained by the locking lever 96 and the headrest assembly 20, with the mounting post(s) 34 can be moved vertically in the y direction with respect to the receiver 42. From the foregoing, it can also be appreciated that the headrest assembly 20 does not have to move vertically in the y direction to be biased, or tilted, forward.

The amount of tilt needed to disengage the catch 100 of the locking lever 96 out of engagement with the teeth 100 on the mounting post 34 may vary. In one embodiment, a deviation from vertical of the mounting post 34 of approximately 1-4 degrees may be sufficient. In a preferred embodiment, the mounting post 34 may be moved approximately 2-3 degrees to disengage the catch from the teeth 104.

Once the catch 100 is free of the teeth 104 the headrest assembly 20 can be moved vertically with respect to the receiver 42. As such, the headrest assembly 20 can be move upwardly, as shown in FIGS. 5 and 6. This permits the user to adjust the headrest assembly 20 to the desired position.

Once in the desired position, the user can reverse the tilt direction of the headrest assembly 20. After a few degrees of rearward tilt, such as in the x-direction, the catch 100 on the locking lever 96 reengages with the teeth 104 on the mounting post 34 which locks the mounting post 34, and thus the headrest assembly 20, in a fixed vertical orientation.

Of course, if the headrest assembly 20 is too high or too low, the process essentially as described above can also be used to adjust the headrest assembly 20 to a different position.

Figure 11:
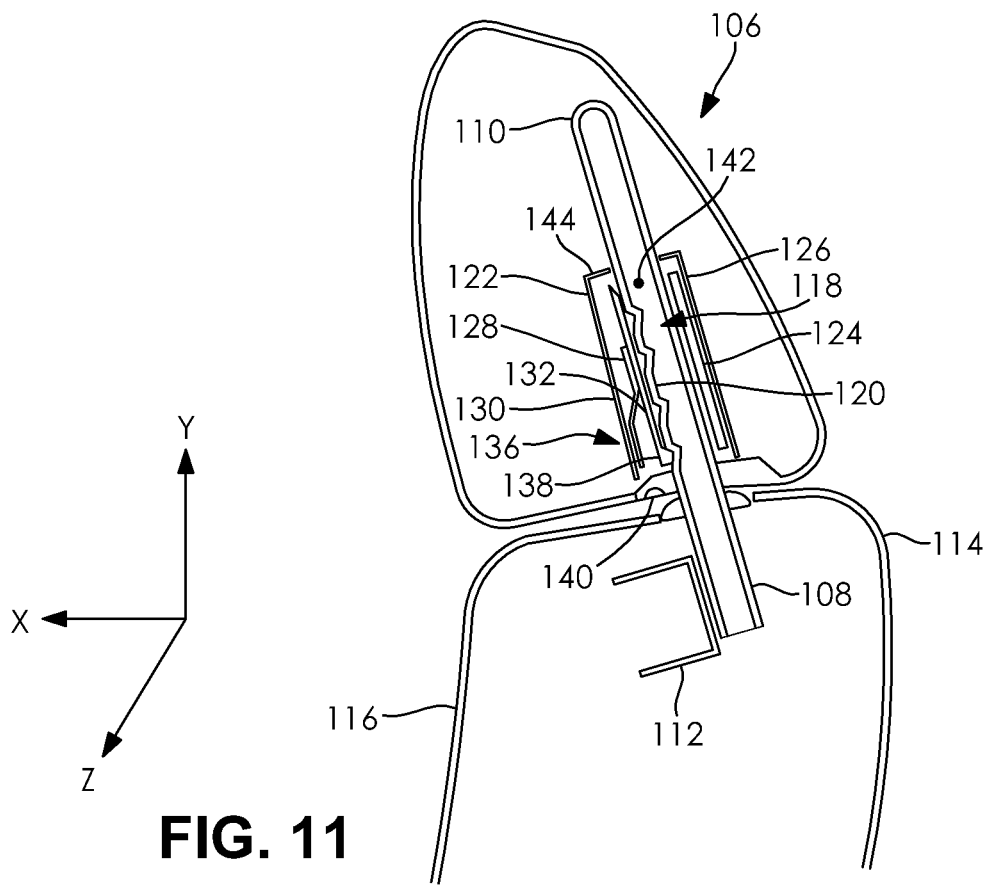
FIG. 11 depicts a cutaway side view of another embodiment of a headrest assembly in one state.
Figure 12:
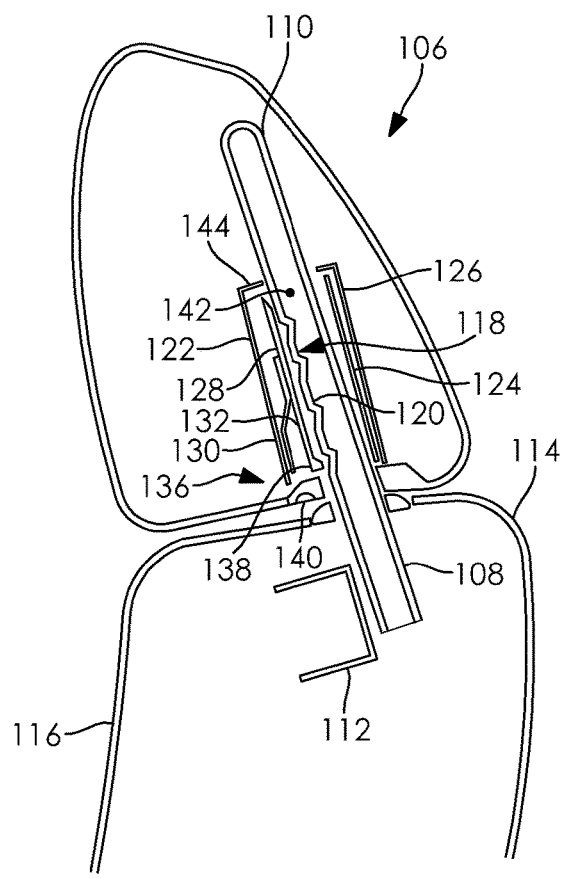
FIG. 12 depicts a cutaway side view of another embodiment of the headrest assembly of FIG. 11 in a second state.
Figure 13:
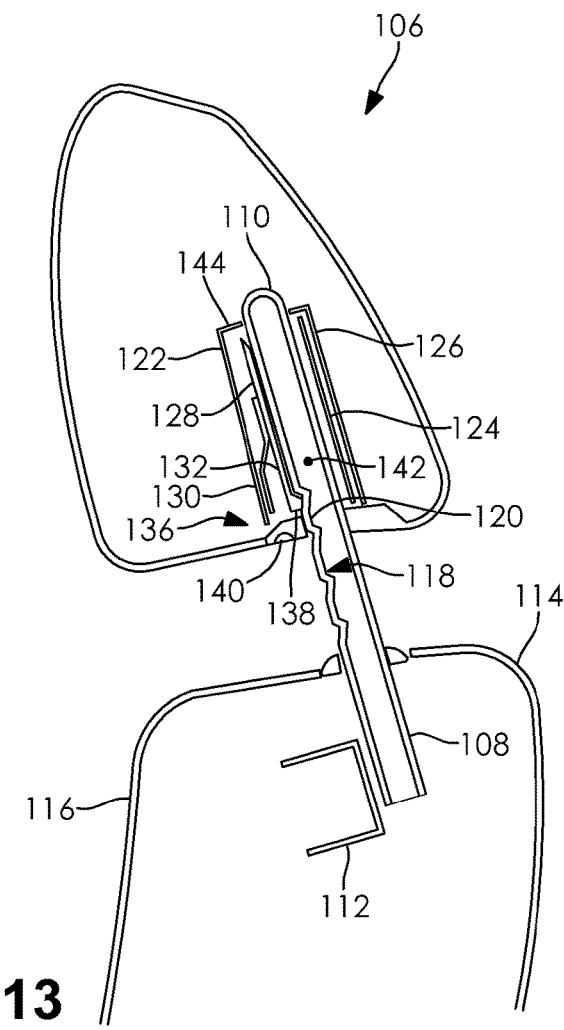
FIG. 13 depicts a cutaway side view of another embodiment of the headrest assembly of FIG. 11 in a third state.

FIGS. 11-13 depict an alternative embodiment for a headrest assembly 106. In this embodiment a fixed rod 108, which may be part of a headrest frame 110, essentially as described above, may extend into the headrest assembly 106. The fixed rod 108 may be comprised of at least one mounting post 112 which extends into a seat back 114 of the seat 116. A portion 118 of the fixed rod 108 that extends from the seat back 114 may have a plurality of teeth 120 faxing the x-direction as the teeth 20 are provided one above the other in the y-direction.

The headrest assembly 106 may also have a sleeve/slide bushing assembly 122. The assembly 122 may be fixed within the headrest assembly 106. The sleeve/slide bushing assembly 122 may be the same, or similar to, the receiver 42, the fixed guide 48 and/or front guide 50 discussed and depicted in the embodiments above.

A rear biasing, or cushioning, material 124 may be located between a rear wall 126 of the sleeve/side bushing assembly 122 and the fixed rod 108. This material 124 may be such as foam, or it may be such as a leaf-type spring. The material 124 may assist in locating and cushioning the parts of the assembly 122 with respect to one another.

Additionally, a front biasing material 128 may be located between a front wall 130 of the sleeve/side bushing assembly 122 and the fixed rod 108. The front biasing material 128 may be such as a leaf-type spring as described and depicted in the previous embodiment.

The front biasing material 128 may bias a front guide 132, or a structure associated with a locking member, into teeth located on the fixed rod. In one embedment, the front guide 132 may located directly by the fixed rod 108. A lower portion of the front guide 132 may have a tooth 138 directed toward the teeth 134 on the fixed rod 108. The front guide 132, and the tooth 138, may be biased by the front biasing material 128 toward the teeth 120 on the fixed rod 108. A release lever 140, located below the tooth 138, may also be used to release the tooth 138 from the teeth 134. Namely, the release lever 140 may be moved to move the tooth 138 from the teeth 134 in the x direction. The lever 140 can also be used to release the headrest assembly 106 from the fixed rod 108. The tooth 138 may also be as the locking lever 96 and catch 100 as described and depicted above. In any case, the tooth 138 secures the headrest assembly 106 to the rod 108 preventing the headrest assembly 106 from moving up or down on the rod 108.

In some embodiments, the headrest assembly 106 can be selectively laterally (e.g., front to back in the x direction) moved. By way of one example, FIG. 11 depicts the headrest assembly 106 in a lowered position. In another position, the headrest assembly 106 may be biased, or tilted, forward in the x direction, as shown in FIG. 12. The tilt takes the tooth 138 out of engagement with the teeth 120 on the fixed rod 108. As a result, the headrest assembly 106 is no longer constrained by the tooth 138 and the headrest assembly 106 can be moved vertically with respect to the fixed rod 108. The headrest assembly 106 can also be tilted without being raised, or appreciably raised, through the mechanisms mentioned above.

As noted above in the previous embodiment, the amount of tilt of the headrest assembly 106 needed to disengage the tooth 138 may vary. As shown in the figures, the headrest assembly 106 may tilt, or pivot, about a pivot point 142 within the headrest assembly 106. The pivot point 142 may be located on the fixed rod 108 at a location within the headrest assembly 106. In some embodiments, the pivot point 142 may be located with the receiver/sleeve/slide bushing assembly 122. Further, the pivot point 142 may be located on the fixed rod 108 and adjacent an upper, or top, wall 144 of the receiver/sleeve/slide bushing assembly 122.

Once the tooth 138 is free of the teeth 120 the headrest assembly 106 can be moved vertically in the y direction with respect to the sleeve/slide bushing assembly 122. As such, the headrest assembly 106 can be move upwardly, as shown in FIGS. 12 and 13. This permits the user to adjust the headrest assembly 106 to the desired position.

Once in the desired position, the user can reverse the tilt direction of the headrest assembly 106. After a few degrees of rearward tilt in the x direction, the tooth 136 reengages with the teeth 120 on the mounting post 112 which locks the headrest assembly 106 in a fixed vertical orientation.

Of course, if the headrest assembly 106 is too high or too low, the process essentially as described above can also be used to adjust the headrest assembly 106 to a different position.

Figure 14:
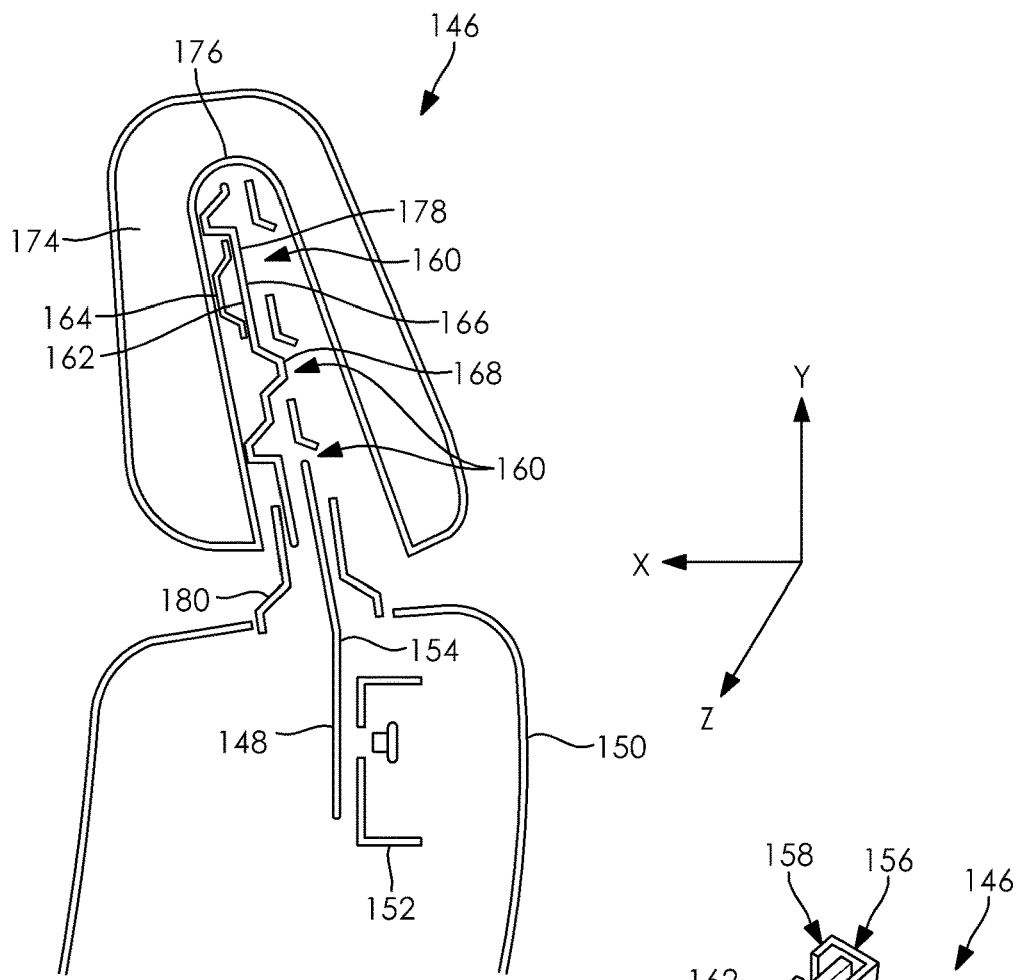
FIG. 14 depicts a cutaway side view of another embodiment of a headrest assembly in a first state.
Figure 15:
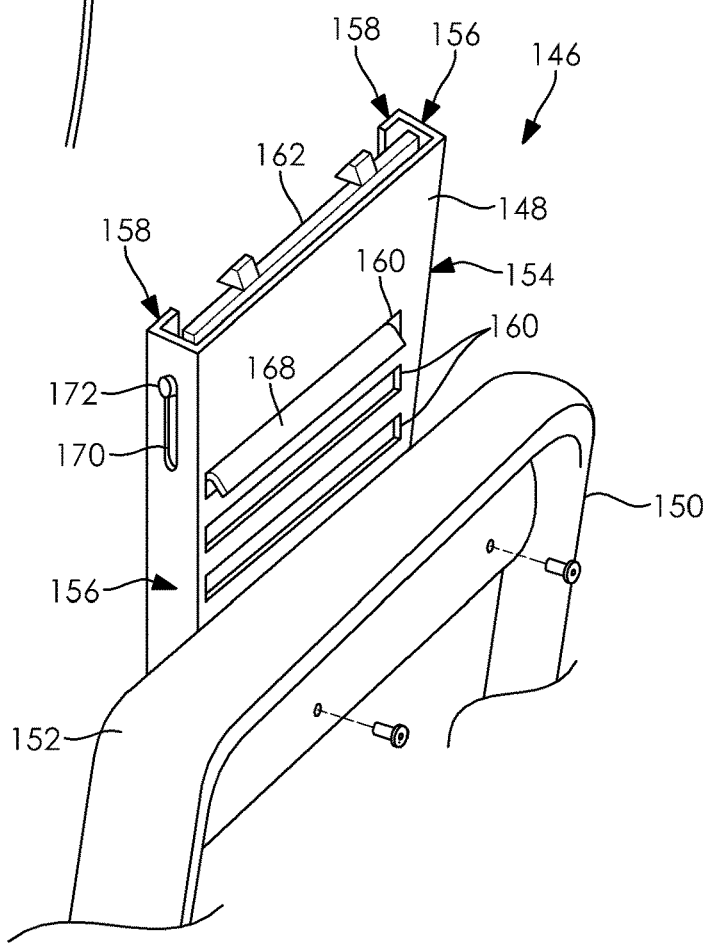
FIG. 15 depicts a cutaway side view of another embodiment of the headrest assembly of FIG. 14 in a second state.

FIGS. 14 and 15 depict yet another embodiment of a headrest assembly 146. This embodiment may have a fixed plate 148 that is secured to a seat back 150. It may be that the fixed plate 148 is bolted to the seat back 150, such as to the seat back frame 152, but other attachment structures are permissible. The fixed plate 148 may generally extend in the y direction.

The fixed plate 148 may have a rear portion 154 bounded by two side portions 156. The side portions 156 may be formed, with the rear portion 154, to create channels 158. The channels 158 may be continuous or there may be gaps along walls that form the channels 158. In some embodiments, the channels 158 may have a generally C-shaped cross section when viewed in the y direction.

The rear portion 154 of the fixed plate 148 may have spaced apart windows 160 located generally parallel one another. The windows 160 may be equally spaced apart and they may be of the same size and shape as one another. The figures depict three windows 160 but a greater or fewer number of windows 160 is permissible.

An adjustment plate 162 may be located adjacent the fixed plate 148. In some embodiments, the adjustment plate 162 may be at least partially nested with fixed plate 148. In one example, the adjustment plate 162 may be located between the side portions 156 so that the side portions 156 retain the adjustment plate 162 in a side-to-side, or z, direction, but the side portions 156 do not prevent the adjustment plate 162 from moving or vertically in the y direction. The side portions 156 may permit the adjustment plate 162 to at least partially move, such as tilt or pivot, in the x-direction.

At least one biasing member 164, such as, but not limited to, a leaf spring, may be located between the adjustment plate 162 and the fixed plate 148. In one embodiment, the biasing member 164 may be positioned between one of the side portions 156 and the adjustment plate 160. The biasing member 164 urges the adjustment plate 162 rearwardly in the x direction toward the fixed plate 148.

A rear surface 166 of the adjustment plate 162 may be provided with at least one extension 168. The extension 168 may extend the adjustment plate 162 in a rearward direction such as the x direction. The extension 168 may be integrally formed, one piece and uniform with the rest of the adjustment plate 162, or it may be separately attached. The extension 168 may be such as a flange or hook-like member designed to be selectively inserted and removed from the windows 160 in the fixed plate 148. The extension 168 may extend generally parallel the windows 160, but it has a smaller z direction so that it may fit within the windows 160.

In one embodiment, at least one slot 170 may be provided in at least one of the side portions 156 of the fixed plate 148. The slot 170 may be substantially vertically oriented such as in the y direction.

At least one pin 172 connected to the adjustment plate 162 may be located within the slot 170 and adapted for vertical movement within the slot 170. The at least one pin 172 may be spring biased to extend outwardly in the z direction.

The adjustment plate 162 may be at least partially located within a headrest 174. Similarly, the fixed plate 148 may be at least partially located within the headrest 174. Both may be housed within the headrest 174 in an insert 176 located within the headrest 174. The insert 176 may extend substantially the length of the headrest 174 within the internal volume of the headrest 174 and have a complementary shape to both the fixed plate 148 and the adjuster plate 162.

In order to adjust the vertical, or y, position of the headrest 174, a user may tilt the headrest 174 forward. The tilt disengages the extension on the adjustment plate 162 with the window 160 in the fixed plate 148. More particularly, the adjustment plate 162 tilts about the pin 172 located within the slot 172, where the pin 172 functions as a pivot point 178 for the adjustment plate 162. The user may then raise or lower the adjustment plate 162, along with the attached headrest 174, to the desired position.

When the headrest 174 is in the desired position, the user tilts the headrest 174 rearwardly so that the extension 168 on the adjustment plate 162 engages with a window 160 in the fixed plate 148. Once located in a window 160 the extension 168 holds the adjustment plate 166, and thus the headrest 174, in the desired vertical, or y axis, location.

A bezel 180 may be located at least about the fixed plate 148 as it extends from the seat back 150 to the headrest 174 to at least partially hide the fixed plate 148. The bezel 180 may extend at least partially into the insert 176.

To remove the headrest 174 from the seat back 150, the user can push the at least one pin 172 inwardly to release it from its slot 170. The headrest 174, along with the attached adjustment plate 162, can then be removed from the fixed plate 148 and the seat back 150.

The systems described above are advantageous because they do not need the user to reach behind their head and try to find a button, or other release device, to adjust the headrests 20, 106, 146. Instead, as can be appreciated from the above, the headrests 20, 106, 146 are the adjustment mechanisms, which permits the user to simply grasp the headrests 20, 106, 146, tilt them to release them from their locked positions, move the released headrests 20, 106, 146 up or down to the desired position and then move the headrests 20, 106, 146 back against the initial tilt direct to reengage the lock.

In accordance with the provisions of the patent statutes, the present device has been described in what is considered to represent its preferred embodiments. However, it should be noted that the invention can be practiced otherwise than as specifically illustrated and described without departing from its spirit or scope.

What is claimed is:

1. A headrest assembly, comprising:
a connecting member extending between a headrest and a seat back of the headrest assembly, said connecting member having a plurality of teeth;
a mechanism located in said headrest or said seat back, wherein a portion of said mechanism is adapted to selectively pivot about said connecting member, wherein a pivot in a first direction releases said mechanism from said plurality of teeth and permits said connecting member or said mechanism to move with respect to one another, wherein a pivot in a second direction, opposite said first direction, locks said mechanism to said teeth to prevent the headrest from moving vertically with respect to the seat back;
wherein said connecting member is a rod fixed with respect to said headrest,
wherein said mechanism comprises a tooth that is selectively biased into engagement with said plurality of teeth on said rod.

2. The headrest assembly of claim 1, wherein said tooth is biased by a leaf spring located between a front guide containing said tooth and a front wall of said mechanism.

3. The headrest assembly of claim 2, wherein said front guide extends substantially parallel said rod.

4. The headrest assembly of claim 1, wherein a pivot point for said headrest is located on said rod in said headrest, said pivot point located above said tooth.

5. The headrest assembly of claim 1, wherein said mechanism comprises a fixed guide and a guide that pivots within the fixed guide, wherein the connecting member extends at least partially into both the fixed guide and the pivoting guide, wherein the fixed guide comprises two parallel legs that have aligned pin apertures and the pivoting guide has pins adapted to fit within the pin apertures.

6. The headrest assembly of claim 5, wherein the pin apertures and pins create a pivot axis for the fixed guide and the pivoting guide.

7. The headrest assembly of claim 5, wherein the fixed guide has a front opening into which the pivoting guide selectively extends.

8. The headrest assembly of claim 5, wherein the fixed guide has a collar extending about the connecting member and located opposite the pin aperture, wherein the collar is a stop for the pivoting guide.

9. A headrest assembly, comprising:
a connecting member extending between a headrest and a seat back of the headrest assembly, said connecting member having a plurality of teeth;
a mechanism located in said seat back comprising a first fixed guide and a second guide, wherein the second guide is adapted to pivot out a front portion of the first guide, wherein a pivot in a first direction releases said connecting member from said mechanism and permits said connecting member to move with respect to said mechanism, wherein a pivot in a second direction, opposite said first direction, locks said connecting member to said mechanism to prevent the headrest from moving vertically with respect to the seat back.

10. The headrest assembly of claim 9, wherein said connecting member comprises a rod with the plurality of teeth formed thereon.

11. The headrest assembly of claim 9, wherein said second guide is pivotally connected to said first fixed guide at lower portions of both said second guide and said first fixed guide.

12. The headrest assembly of claim 9, wherein said rod extends through both said second guide and said first guide, and wherein said rod is adapted for selective vertical movement with respect to both guides.

* * * * *